United States Patent
Collias et al.

(10) Patent No.: US 11,993,682 B2
(45) Date of Patent: *May 28, 2024

(54) METHOD FOR PRODUCING RECYCLED HIGH-DENSITY POLYETHYLENE WITH NATURAL-LIKE OPTICAL PROPERTIES

(71) Applicant: The Procter & Gamble Company, Cincinnati, OH (US)

(72) Inventors: Dimitris Ioannis Collias, Mason, OH (US); Amy Eichstadt Waun, West Chester, OH (US); James Carmony, Lewisburg, OH (US); John Moncrief Layman, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,706

(22) Filed: Mar. 15, 2023

(65) Prior Publication Data
US 2023/0235150 A1 Jul. 27, 2023

Related U.S. Application Data

(63) Continuation of application No. 18/116,357, filed on Mar. 2, 2023, which is a continuation of application No. 17/364,992, filed on Jul. 1, 2021.

(60) Provisional application No. 63/057,369, filed on Jul. 28, 2020.

(51) Int. Cl.
C08J 11/08 (2006.01)

(52) U.S. Cl.
CPC ............ C08J 11/08 (2013.01); *C08J 2323/06* (2013.01)

(58) Field of Classification Search
USPC ........................................................ 521/47
See application file for complete search history.

(56) References Cited

U.S. PATENT DOCUMENTS

| 5,198,471 | A | 3/1993 | Nauman et al. |
| 5,233,021 | A | 8/1993 | Sikorski |
| 5,739,270 | A | 4/1998 | Farmer et al. |
| 6,555,588 | B2 | 4/2003 | Gorski et al. |
| 7,935,736 | B2 | 5/2011 | Maeurer et al. |
| 9,695,259 | B2 * | 7/2017 | Layman ................. C08G 77/34 |
| 9,803,035 | B2 * | 10/2017 | Layman ................. B29B 7/002 |
| 9,834,621 | B2 | 12/2017 | Layman et al. |
| 9,890,225 | B2 * | 2/2018 | Layman ................. C08F 6/008 |
| 9,982,066 | B2 * | 5/2018 | Layman ................. C08J 11/08 |
| 10,435,532 | B2 * | 10/2019 | Layman ................. C08J 11/08 |
| 10,442,912 | B2 * | 10/2019 | Layman ................. B29B 17/02 |
| 10,450,436 | B2 * | 10/2019 | Layman ................. B29B 17/02 |
| 10,465,058 | B2 * | 11/2019 | Layman ................. C08J 11/06 |
| 10,899,906 | B2 * | 1/2021 | Layman ................. C08J 11/08 |
| 10,941,269 | B2 * | 3/2021 | Layman ................. C08J 11/08 |
| 11,008,433 | B2 * | 5/2021 | Layman ................. C08J 11/08 |
| 2017/0002111 | A1 | 1/2017 | Layman et al. |
| 2019/0390032 | A1 | 12/2019 | Layman |
| 2022/0033612 | A1 | 2/2022 | Collias et al. |
| 2022/0033613 | A1 | 2/2022 | Collias et al. |
| 2023/0007899 | A1 | 1/2023 | Collias et al. |

FOREIGN PATENT DOCUMENTS

| EP | 0849312 A1 | 6/1998 |
| WO | 2022026197 A1 | 2/2022 |

OTHER PUBLICATIONS

PCT Search Report and Written Opinion for PCT/US2021/041765 dated Feb. 22, 2022, 12 pages.
Al-Salem et al. "Recycling and recovery routes of plastic solid waste (PSW): A review", Waste Management, vol. 29, accepted on Jun. 4, 2009, pp. 2625-2643.
All Office Actions; U.S. Appl. No. 17/364,984, filed Jul. 1, 2021.
All Office Actions; U.S. Appl. No. 17/364,992, filed Jul. 1, 2021.
All Office Actions; U.S. Appl. No. 17/370,029, filed Jul. 8, 2021.
All Office Actions; U.S. Appl. No. 18/116,357, filed Mar. 2, 2023.
All Office Actions; U.S. Appl. No. 18/121,677, filed Mar. 15, 2023.
U.S. Appl. No. 18/116,357, filed Mar. 2, 2023, to Dimitris Ioannis Collias et al.
U.S. Appl. No. 18/121,677, filed Mar. 15, 2023, to Dimitris Ioannis Collias et al.

* cited by examiner

*Primary Examiner* — Terressa Boykin
(74) *Attorney, Agent, or Firm* — Kathleen Y. Carter; James E. Oehlenschlager

(57) ABSTRACT

A method for purifying a contaminated reclaimed HDPE is provided. The method comprises obtaining the contaminated reclaimed HDPE, extracting it with a solvent to produce an extracted contaminated reclaimed HDPE, and then dissolving it in the solvent to produce a first suspension comprising dissolved HDPE and suspended contaminants. The first suspension is settled to produce a second suspension comprising dissolved HDPE and suspended remaining contaminants, and the second suspension is purified by contacting it with solid media to produce a third suspension comprising purer HDPE. Finally, the purer HDPE is separated from the third suspension and it has natural-like optical properties.

16 Claims, 2 Drawing Sheets

METHOD FOR PRODUCING RECYCLED HIGH-DENSITY POLYETHYLENE WITH NATURAL-LIKE OPTICAL PROPERTIES

FIELD OF THE INVENTION

The present invention generally relates to a method for purifying contaminated reclaimed high-density polyethylene (crHDPE) through the use of a pressurized solvent, and extraction and dissolution steps. More specifically, this invention relates to a method for purifying crHDPE, such as post-consumer recycled HDPE (PCR HDPE) and post-industrial recycled HDPE (PIR HDPE), to produce recycled HDPE with natural-like optical properties (nlHDPE).

BACKGROUND OF THE INVENTION

Polymers, especially synthetic plastics, are ubiquitous in daily life due to their relatively low production costs and good balance of material properties. Synthetic plastics are used in a wide variety of applications, such as packaging, automotive components, medical devices, and consumer goods. To meet the high demand of these applications, tens of millions of tons of synthetic plastics are produced globally on an annual basis. The overwhelming majority of synthetic plastics are produced from increasingly scarce fossil sources, such as petroleum and natural gas. Additionally, the manufacturing of synthetic plastics from fossil sources consumes a lot of energy and produces $CO_2$ as a by-product.

The ubiquitous use of synthetic plastics has consequently resulted in millions of tons of plastic waste being generated every year. While the majority of plastic waste is landfilled via municipal solid waste programs (about 79% globally) or incinerated for energy recovery (about 12% globally), a significant portion of plastic waste is found in the environment as litter, which is unsightly and potentially harmful to ecosystems. Plastic waste is often washed into river systems and ultimately out to sea.

Plastics recycling has emerged as one solution to mitigate the issues associated with the wide-spread usage of plastics, their end-of-life, and their leakage to the environment. Recovering and re-using plastics diverts waste from landfills and reduces the demand for virgin plastics made from fossil-based resources, which consequently reduces greenhouse gas emissions. In developed regions, such as the United States and the European Union, rates of plastics recycling are increasing due to greater awareness by consumers, businesses, and industrial manufacturing operations. The majority of recycled materials, including plastics, are mixed into a single stream which is collected and processed by a material recovery facility (MRF). At the MRF, materials are sorted, washed, and packaged for resale. Plastics can be sorted into individual materials, such as high-density polyethylene (HDPE), poly(ethylene terephthalate) (PET), or mixed streams of other common plastics, such as polypropylene (PP), low-density polyethylene (LDPE), poly(vinyl chloride) (PVC), polystyrene (PS), polycarbonate (PC), and polyamides (PA). The single or mixed streams can then be further sorted, washed, and reprocessed into pellets that are suitable for re-use in plastics processing, for example blow and injection molding.

Though recycled plastics are sorted into predominately uniform streams and are washed with aqueous and/or caustic solutions, the final reprocessed pellets often remain highly contaminated with unwanted waste impurities, such as spoiled food residue and residual perfume components. In addition, recycled plastic pellets, except for those from recycled beverage containers, are darkly colored due to the mixture of dyes and pigments commonly used to color plastic articles. While there are some applications that are insensitive to color and contamination (for example, black plastic paint containers and concealed automotive components), the majority of applications require non-colored pellets. The need for high quality, "natural-like" recycled HDPE, is especially important for packaging applications, such as blow molding applications. In addition to being contaminated with impurities and mixed colorants, many recycled resin products are often heterogeneous in chemical composition and may contain a significant amount of polymeric contamination, such as recycled polypropylene contamination in polyethylene and vice versa.

Mechanical recycling is the process of converting recycled plastic waste into a re-usable form for subsequent manufacturing. A more detailed review of mechanical recycling and other plastics recovery processes are described in Al-Salem, S. M., et al., *Waste Management,* 29(10) (2009), 2625-2643. While advances in mechanical recycling technology have improved the quality of recycled polymers to some degree, there are fundamental limitations of mechanical decontamination approaches, such as the physical entrapment of pigments within a polymer matrix. Thus, even with the improvements in mechanical recycling technology, the dark color and high levels of chemical contamination in currently available recycled plastic waste prevents broader usage of recycled resins by the plastics industry.

To overcome the fundamental limitations of mechanical recycling, there have been many methods developed to purify contaminated polymers, such as chemical recycling and solvent-based recycling. The latter methods use solvents to decontaminate and purify polymers. The use of solvents enables the extraction of impurities and the dissolution of polymers, which further enables alternative separation technologies. U.S. Pat. No. 7,935,736 discloses a method for recycling polyester from a waste stream using a solvent to dissolve the polyester prior to cleaning. The patent also describes the need to use a precipitant to recover the polyester from the solvent.

U.S. Pat. No. 6,555,588 discloses a method to produce a polypropylene blend from a plastic mixture comprising other polymers. The patent describes the extraction of contaminants from a polymer at a temperature below the dissolution temperature of the polymer in the selected solvent, such as hexane, for a specified residence period. The patent further describes increasing the temperature of the solvent (or adding a second solvent) to dissolve the polymer prior to filtration. Furthermore, the patent describes the use of shearing or flow to precipitate polypropylene from solution. The polypropylene blend described in the patent contained polyethylene contamination up to 5.6 wt %.

European Patent Application No. 849,312 discloses a process to obtain purified polyolefins from a polyolefin-containing plastic mixture or a polyolefin-containing waste. The patent application describes the extraction of polyolefin mixtures or wastes with a hydrocarbon fraction of gasoline or diesel fuel with a boiling point above 90° C. at temperatures between 90° C. and the boiling point of the hydrocarbon solvent. The patent application further describes contacting a hot polyolefin solution with bleaching clay and/or activated carbon to remove foreign components from the solution. Furthermore, the patent application describes cooling the solution to temperatures below 70° C. to crystallize the polyolefin and then removing the solvent by a variety of methods, such as heating the polyolefin above its melting point, evaporating the solvent in a vacuum, passing a gas stream through the polyolefin precipitate, or extraction of the solvent with an alcohol or ketone that boils below the melting point of the polyolefin.

U.S. Pat. No. 5,198,471 discloses a method for separating polymers from a physically commingled solid mixture (for example, waste plastics) containing a plurality of polymers using a solvent at a first lower temperature to form a first single phase solution and a remaining solid component. The patent further describes heating the solvent to higher temperatures to dissolve additional polymers that were not solubilized at the first lower temperature, and the filtration of insoluble polymer components.

U.S. Pat. No. 5,233,021 discloses a method of extracting pure polymeric components from a multi-component structure (for example, waste carpets) by dissolving each component at an appropriate temperature and pressure in a supercritical fluid and then varying the temperature and/or pressure to extract particular components in sequence. However, similar to the '471 patent, the '021 patent only discloses filtration of undissolved components.

U.S. Pat. No. 5,739,270 discloses a method and apparatus for continuously separating a polymer component of a plastic from contaminants and other components of the plastic using a co-solvent and a working fluid. The co-solvent at least partially dissolves the polymer and the second fluid (that is in a liquid, critical, or supercritical state) solubilizes components from the polymer and precipitates some of the dissolved polymer from the co-solvent. The patent further discloses the step of filtering the thermoplastic-co-solvent (with or without the working fluid) to remove particulate contaminants, such as glass particles.

The known solvent-based methods to purify contaminated polymers, as described above, do not produce polymer with natural-like optical properties. In the previous methods, co-dissolution and thus cross contamination of other polymers often occurs. If an adsorbent is used, a filtration and/or centrifugation step is often employed to remove the used adsorbent from solution. In addition, isolation processes to remove solvent, such as heating, vacuum evaporation, and/ or precipitation using a precipitating chemical, are used to produce a polymer free of residual solvent.

Recycled HDPE (also known as HDPE Jazz Flake or colored recycled HDPE—that contains flakes with different colors) can be re-used in blow molding applications, for example in a middle layer, whereas the inner and outer layers are from virgin HDPE. If the recycled HDPE is used in the middle layer of bottles without any additional processing, then its color needs to be masked with additional colorants (to make sure that it does not affect the overall color of the bottle) and its odor has to be neutralized if not removed (so that it does not affect the odor of the product). However, if the recycled HDPE comes from milk jugs (i.e., natural recycled HDPE), then a much smaller quantity of colorants would be needed (because of its natural color) and the odor masking needed might be minimal. The volume of natural recycled HDPE is not sufficient to meet the demand of recycled HDPE for blow molding applications and thus there is a very strong commercial need to convert recycled HDPE to natural-like HDPE.

Accordingly, there is a need for a purification technology that can be fed with contaminated HDPE waste and produce HDPE that has "natural-like" optical properties using a simple process with few unit operations, and employing a solvent that is readily and economically available, and requires a relatively low pressure.

SUMMARY OF THE INVENTION

In one embodiment of the present invention, a method for purifying contaminated reclaimed high-density polyethylene (crHDPE) to produce recycled high-density polyethylene with natural-like optical properties (nlHDPE) is presented. The method comprises: a) Obtaining said crHDPE; wherein said crHDPE is selected from the group consisting of post-consumer recycled (PCR) HDPE, post-industrial recycled (PIR) HDPE, and combinations thereof; b) Obtaining a solvent; wherein said solvent and said crHDPE form a one-phase solution at a temperature and at a pressure higher than the cloud point pressure corresponding to said temperature; wherein said cloud point pressure: (i) corresponds to a solution of said crHDPE in said solvent at about 5 wt % concentration; (ii) is a monotonically increasing function of temperature; (iii) is lower than the following pressure levels: about 700 psig (48.3 barg) at about 120° C., about 1,150 psig (79.3 barg) at about 140° C., about 1,450 psig (100 barg) at about 160° C., and about 1,800 psig (124.1 barg) at about 180° C.; (iv) includes smooth extrapolations at temperatures lower than about 120° C. and higher than about 180° C.; and (v) includes smooth interpolations at temperatures between about 120° C. and about 180° C.; c) Extracting said crHDPE with said solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed HDPE (ecrHDPE) is produced; d) Dissolving the ecrHDPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved HDPE and suspended particulate contaminants is produced; e) Settling said first suspension at a settling temperature and at a settling pressure; wherein said settling temperature is from about 120° C. to about 260° C.; wherein said settling pressure is above the cloud point pressure corresponding to said settling temperature; and wherein a second suspension comprising dissolved HDPE and suspended remaining particulate contaminants is produced; f) Purifying said second suspension at a purification temperature and at a purification pressure by contacting said second suspension with solid media; wherein said purification temperature is from about 120° C. to about 260° C.; wherein said purification pressure is above the cloud point pressure corresponding to said purification temperature; and wherein a third suspension comprising purer HDPE is produced; and g) Separating said purer HDPE from said third suspension; and wherein said purer HDPE is said nlHDPE.

In another embodiment of the present invention, a method for purifying crHDPE to produce nlHDPE is presented. The method comprises: a) Obtaining said crHDPE; wherein said crHDPE is selected from the group consisting of post-consumer recycled (PCR) HDPE, post-industrial recycled (PIR) HDPE, and combinations thereof; b) Extracting said crHDPE with hexanes at an extraction mass concentration of about 3.5 wt %, at an extraction temperature of about 230° C., and at an extraction pressure of about 600 psig (41.4 barg) to produce an extracted contaminated reclaimed HDPE (ecrHDPE); c) Dissolving the ecrHDPE in hexanes at a mass concentration of about 3.5 wt %, at a dissolution temperature of about 210° C., and at a dissolution pressure of about 1,900 psig (131 barg) to produce a first suspension comprising dissolved HDPE and suspended particulate contaminants; d) Settling said first suspension at about 210° C. and at about 1,900 psig (131 barg) to produce a second suspension comprising dissolved HDPE and suspended remaining particulate contaminants; e) Purifying said second suspension by contacting said second suspension with solid media at about 210° C. and at about 1,900 psig (131 barg) to produce a third suspension comprising purer HDPE; wherein said purification comprises contacting said second suspension with said solid media in a candle filter followed by an axial flow filter; and wherein said solid media of said candle filter comprise diatomaceous earth and said solid media of said axial flow filter comprise activated alumina; and f) Separating said purer HDPE from said third suspension; wherein said purer HDPE is said nlHDPE; and wherein said nlHDPE has L* greater than about 75, a* greater than about −6, b* less than about 11, and Y less than about 80%.

DETAILED DESCRIPTION OF THE INVENTION

I. Definitions

Figure 1:
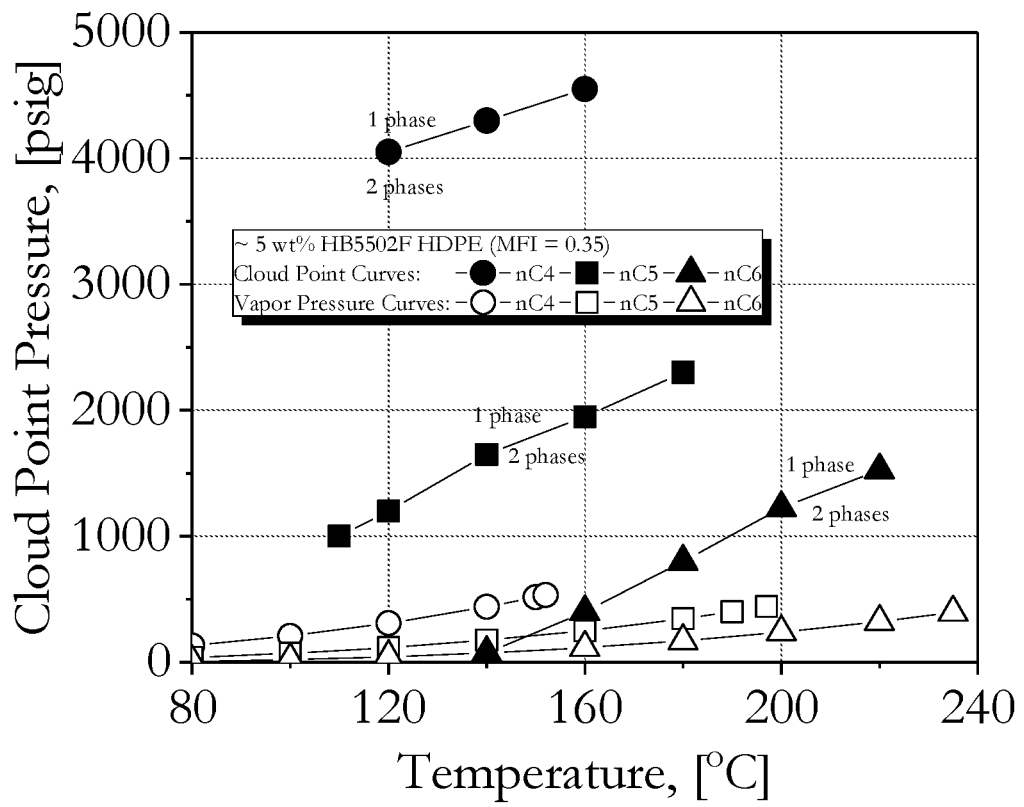
FIG. 1 is a diagram of cloud point pressure curves of solutions of HDPE in n-butane, n-pentane, and hexanes. The vapor pressure curves of the 3 solvents are also included. Each solution contains about 5 wt % of Formolene® HB5502F HDPE (Formosa Plastics Corp., Livingston, NJ), which is a blow molding grade and has a melt flow index (MFI) of about 0.35 g/10 min.

As used herein, the term "reclaimed HDPE" refers to an HDPE that was used for a previous purpose and then collected for the purpose of recycling.

As used herein, the term "contaminated reclaimed HDPE" (crHDPE) refers to a reclaimed HDPE that was contaminated with particulate contaminants and other contaminants. Non-limiting examples of other contaminants are odors, flavors, dyes, surfactants, surface prints, etc.

As used herein, the term "recycled HDPE" refers to a product of a recycling process that has been fed with reclaimed HDPE.

As used herein, the term "post-consumer recycled" (PCR) material refers to a material in a waste stream that an end consumer has used and disposed of.

As used herein, the term "post-industrial recycled" (PIR) material refers to a material in a waste stream of a manufacturing plant that is produced after the manufacture of a good or product. Non-limiting examples of PIR materials are manufacturing wastes, such as industrial scrap and part trimmings.

As used herein, the term "solvent" refers to a material that dissolves HDPE and may also be at, near, or above its critical temperature and critical pressure (critical point). It is well known to those having ordinary skill in the art that substances above their critical point are known as "supercritical fluids" which do not have the typical physical properties (i.e., density) of a liquid.

As used herein, the term "dissolved" refers to the partial (at a minimum) incorporation of an HDPE solute in a solvent at the molecular level.

As used herein, the term "standard boiling point" refers to the boiling temperature at an absolute pressure of exactly 100 kPa (1 bar, 14.5 psia, 0.9869 atm) as established by the International Union of Pure and Applied Chemistry (IUPAC).

As used herein, the term "suspension" refers to a suspension of particulate contaminants in an HDPE solution.

As used herein, the term "particulate contaminants" refers to particulate matter that is present throughout the bulk or surface of HDPE articles. These particulate contaminants can be additives that suppliers typically incorporate into HDPE to protect and/or extend its life, contaminants left onto the HDPE articles from their consumer use, contaminants attached to the HDPE articles during their disposal in the waste stream and reclaiming, etc. Non-limiting examples of particulate contaminants, that suppliers incorporate into HDPE, are antioxidants (either primary or secondary), anti-blocking agents, anti-stat agents, UV stabilizers, flame retardants, and colorants.

As used herein, the term "solid media" refers to media, in particulate, woven, or non-woven shapes, used in filtration operations. These operations can be axial flow or radial flow, or other operations.

As used herein, the term "purer HDPE" refers to an HDPE having fewer contaminants relative to the same HDPE prior to a purification step.

As used herein, the term "extraction" refers to the process step of transferring solute species from a liquid phase (or solid matrix) and across a phase boundary to a separate immiscible liquid phase.

As used herein, the term "extracted" refers to a material having fewer solute species relative to the same material prior to an extraction step.

As used here, the term "extracted reclaimed HDPE" refers to a reclaimed HDPE having fewer solute species relative to the same reclaimed HDPE prior to an extraction step.

As used herein, the term "natural-like" HDPE means an HDPE that has essentially similar properties and composition to a natural HDPE (e.g. HDPE used in milk jugs).

As used herein, the term "natural-like optical properties" refers to L* (CIE (Commission Internationale de l'Eclairage) lightness axis; 0 is black and 100 is white) greater than about 75, a* (CIE red-green axis; negative value is green, positive value is red, and 0 is neutral) greater than about −6, b* (CIE blue-yellow axis; negative value is blue, positive value is yellow, and 0 is neutral) lower than about 11, and Y (CIE contrast ratio opacity) lower than about 80%. As used herein, the term "virgin-like" HDPE means an HDPE that has essentially similar properties and composition to a virgin HDPE.

As used herein, the term "virgin-like optical properties" refers to L* greater than about 82, a* greater than about −3, b* lower than about 5, and Y lower than about 40%.

As used herein, the term "hexanes" refers to a blend of hexane isomers, such as normal hexane (at least 45 vol %, and typically, about 53 vol %), iso hexane (2-methylpentane, 3-methylpentane, and 2,3-dimethylbutane), and neo hexane (2,2-dimethylbutane).

II. Feedstock—Waste HDPE

Unexpectedly, it has been found that solvents which form solutions of waste HDPE and have a cloud point pressure that is lower than a threshold pressure at a certain temperature generate purer HDPE with natural-like optical properties. Under these conditions, these solvents are considered θ or good solvents. For HDPE, non-limiting examples of θ or good solvents are normal hexane (n-hexane) and hexanes. For example, at 160° C., the cloud point pressure of a solution of about 5 wt % HDPE in hexanes (θ or good solvent) is about 383 psig (26.4 barg). As the number of carbon atoms in an alkane solvent increases, the alkane becomes a better solvent (e.g., moves from poor to θ and then to good solvent).

Similarly, it has been unexpectedly found that solvents which form solutions of waste HDPE and have a cloud point pressure that is greater than a threshold pressure at a certain temperature generate purer HDPE with virgin-like optical properties. For example, at 160° C., the cloud point pressure of a solution of about 5 wt % HDPE in normal pentane (poor solvent) is about 1,950 psig (134.4 barg) and in normal butane (poor solvent) is about 4,550 psig (313.7 barg).

Not wishing to be bound by any theory, applicants believe that key to the conversion of waste HDPE to purer HDPE with natural-like optical properties is the quality of the solvent. If the solvent is a poor solvent and thus the cloud point pressure is relatively high, the purer HDPE can have virgin-like properties; however, as the quality of the solvent increases and the cloud point pressure decreases, and the solvent becomes good solvent, the purer HDPE can have natural-like properties.

If the solvent is a poor solvent, then the HDPE molecules are collapsed into dense coils (like spheres, with solvent molecules essentially excluded from these coils). The radius of gyration, $R_g$, of these dense coils is on the order of a few nm for a 100,000 Da HDPE molecule, and the expectation is that these dense coils do not interact with the suspended particulate contaminants. If the solvent is a θ solvent, then the HDPE molecules are expanded to some degree assuming random walk conformation and include solvent molecules amongst them. The $R_g$ of these expanded molecules is about one order of magnitude higher than that of the dense coils in the poor solvent and about a few hundreds of nm for a 100,000 Da HDPE molecule. Also, the expectation is that some of these expanded polymer molecules are adsorbed onto the surface of the suspended particulate contaminants and thus inhibit their complete removal by the filtration media. Finally, if the solvent is a good solvent, then the HDPE molecules are rather expanded assuming self-avoiding walk conformation and include a lot of solvent molecules amongst them. The $R_g$ is about one order of magnitude higher than that of the molecules in the θ solvent and about a thousand nm for a 100,000 Da HDPE molecule. Also, the expectation is that some of these HDPE molecules are adsorbed onto the surface of the suspended particulate contaminants and thus inhibit their complete removal by the filtration media.

The feedstock in the present invention is a contaminated reclaimed HDPE (crHDPE). In one embodiment of the present invention, a method for purifying crHDPE to produce recycled HDPE with natural-like optical properties (nlHDPE) comprises obtaining said crHDPE. In another embodiment of the present invention, the crHDPE is selected from the group consisting of post-consumer recycled (PCR) HDPE, post-industrial recycled (PIR) HDPE, special waste stream HDPE, and combinations thereof. In yet another embodiment of the present invention, the crHDPE is selected from the group consisting of PCR HDPE, PIR HDPE, and combinations thereof. In one embodiment of the present invention, a method for purifying crHDPE to produce nlHDPE comprises obtaining said crHDPE, wherein said crHDPE is selected from the group consisting of PCR HDPE, PIR HDPE, and combinations thereof.

Non-limiting examples of sources of PCR HDPE are curbside recycle streams (where end-consumers place used polymers from packages and products into a designated bin for collection by a waste hauler or recycler) and in-store "take-back" programs (where the consumer brings waste polymers into a store and places the waste polymers in a designated collection bin). A non-limiting example of sources of PIR HDPE is waste polymer streams produced during the manufacture or shipment of a good or product that are collected as unusable material by the manufacturer (i.e., trim scraps, out of specification material, and start-up scrap). Non-limiting examples of sources of special waste stream HDPE are recycling of electronic waste (also known as e-waste); recycling of automobiles; and recycling of used carpeting and textiles.

For the purposes of the present invention, the crHDPE is a homogenous composition of an individual HDPE or a mixture of several different HDPE compositions. Non-limiting examples of HDPE compositions are homopolymers and copolymers of ethylene.

Non-limiting examples of contamination in crHDPE are pigments, dyes, process aids, stabilizing additives (e.g., antioxidants), fillers, flame retardants, and other performance additives that were added to the HDPE during polymerization or conversion of the original HDPE to the final form of an article and are necessary for marketing, branding, processability, and/or end use performance. Non-limiting examples of pigments are organic pigments, such as copper phthalocyanine; inorganic pigments, such as titanium dioxide; and other pigments that may be apparent to those having ordinary skill in the art. A non-limiting example of an organic dye is Basic Yellow 51. Non-limiting examples of process aids are antistatic agents, such as glycerol monostearate; and slip-promoting agents, such as erucamide. A non-limiting example of an antioxidant is octadecyl-3-(3,5-di-tert.butyl-4-hydroxyphenyl)-propionate (BASF's Irganox® 1076). Non-limiting examples of fillers are calcium carbonate, talc, and glass fibers. The crHDPE may also contain odors, surface prints, paper labels, adhesives for labels, dirt, and volatile and non-volatile organic compounds. In addition, contaminants may result from interaction with products, e.g., HDPE packaging materials that contain cleaning mixtures (e.g. limonene, surfactants, etc.), food (e.g. various organics), etc. The contamination may be particulate (e.g. fillers, dirt, particulate pigments, etc.) or non-particulate (e.g. dyes, odors, surfactants, volatile organic compounds, etc.).

III. Solvent

HDPE solutions exhibit a cloud point curve, which is their liquid-liquid equilibrium curve. A typical method to measure a cloud point curve is with the use of a view cell, as this is well known to those skilled in the art. A solution of a certain amount of HDPE in a solvent is prepared at a specified temperature and high pressure where the solution is in a one-phase regime. Then, under stirring, the temperature is held constant and the pressure is lowered. At some pressure, called cloud point pressure, the solution becomes cloudy and it enters the two-phase regime, i.e., a heavy phase (also called the raffinate (RAF) phase, which contains high concentration of HDPE in the solvent) and a light phase (also called the extract (EXTR) phase, which contains a very low concentration of HDPE in the solvent). From the two-phase regime, if the pressure is increased then the two-phase system will become a clear solution (one-phase regime) as the pressure crosses the cloud point pressure at that temperature.

Typical examples of cloud point pressure curves are shown in FIG. 1 with solutions of a virgin HDPE in n-butane, n-pentane, and hexanes at about 5 wt % concentration. Other concentrations of HDPE in solvents could shift these cloud point curves shown in FIG. 1 in the pressure/temperature space. For the purposes of the present invention, we consider a solution with about 5 wt % virgin HDPE Formolene® HB5502F in a solvent as the reference solution and 160° C. temperature as the reference temperature.

The solvent of the present invention produces a solution with HDPE at about 5 wt % concentration that has a cloud point pressure that is lower than a certain level. In one embodiment of the present invention, the cloud point pressure of a solution of HDPE at about 5 wt % concentration is lower than about 1,450 psig (100 barg) at about 160° C. In another embodiment of the present invention, the cloud point pressure of a solution of HDPE at about 5 wt % concentration is lower than about 1,000 psig (68.9 barg) at about 160° C.

In one embodiment of the present invention, the cloud point pressure of a solution of HDPE at about 5 wt % concentration is about 100 psig (6.9 barg) at about 140° C. In another embodiment of the present invention, the cloud point pressure of a solution of HDPE at about 5 wt % concentration is about 383 psig (26.4 barg) at about 160° C. In yet another embodiment of the present invention, the cloud point pressure of a solution of HDPE at about 5 wt % concentration is about 770 psig (53.1 barg) at about 180° C. In even yet another embodiment of the present invention, the cloud point pressure of a solution of HDPE at about 5 wt % concentration is about 1,200 psig (82.7 barg) at about 200° C. In one embodiment of the present invention, the cloud point pressure of a solution of HDPE at about 5 wt % concentration is about 1,515 psig (104.5 barg) at about 220° C.

For HDPE solutions, the cloud point pressure is a monotonically increasing function of temperature in the range between about 120° C. and about 260° C. As it is well known to those skilled in the art, the cloud point pressure is a monotonically increasing function of temperature if for temperature 1 less than temperature 2, then the cloud point pressure (at temperature 1) is less than the cloud point pressure (at temperature 2).

In one embodiment of the present invention, a method for purifying crHDPE to produce nlHDPE comprises: a) Obtaining said crHDPE; wherein said crHDPE is selected from the group consisting of post-consumer recycled (PCR) HDPE, post-industrial recycled (PIR) HDPE, and combinations thereof; b) Obtaining a solvent; wherein said solvent and said crHDPE form a one-phase solution at a temperature and at a pressure higher than the cloud point pressure corresponding to said temperature; wherein said cloud point pressure: (i) corresponds to a solution of said crHDPE in said solvent at about 5 wt % concentration; (ii) is a monotonically increasing function of temperature; (iii) is lower than the following pressure levels: about 700 psig (48.3 barg) at about 120° C., about 1,150 psig (79.3 barg) at about 140° C., about 1,450 psig (100 barg) at about 160° C., and about 1,800 psig (124.1 barg) at about 180° C.; (iv) includes smooth extrapolations at temperatures lower than about 120° C. and higher than about 180° C.; and (v) includes smooth interpolations at temperatures between about 120° C. and about 180° C.

In another embodiment of the present invention, a method for purifying crHDPE to produce nlHDPE comprises: a) Obtaining said crHDPE; wherein said crHDPE is selected from the group consisting of post-consumer recycled (PCR) HDPE, post-industrial recycled (PIR) HDPE, and combinations thereof; and b) Obtaining a solvent; wherein said solvent and said crHDPE form a one-phase solution at a temperature and at a pressure higher than the cloud point pressure corresponding to said temperature; wherein said cloud point pressure: (i) corresponds to a solution of said crHDPE in said solvent at about 5 wt % concentration; (ii) is a monotonically increasing function of temperature; (iii) is about 100 psig (6.9 barg) at about 140° C., about 383 psig (26.4 barg) at about 160° C., about 770 psig (53.1 barg) at about 180° C., about 1,200 psig (82.7 barg) at about 200° C., and about 1,515 psig (104.5 barg) at about 220° C.; (iv) includes smooth extrapolations at temperatures lower than about 140° C. and higher than about 220° C.; and (v) includes smooth interpolations at temperatures between about 140° C. and about 220° C.

The normal boiling points of some solvents are as follows: iso-butane: −11.7° C.; iso-butylene: −6.9° C.; 1-butene: −6.3° C.; n-butane: −1° C.; 2-butene: 0.8-3.7° C.; neo-pentane: 9.5° C.; iso-pentane: 27.8° C.; 1-pentene: 30° C.; n-pentane: 36.1° C.; 2-pentene: 36.3° C.; iso-hexane: 60° C.; 1-hexene: 63.9° C.; n-hexane: 68° C.; and 2-hexene: 69.1° C. In one embodiment of the present invention, the solvent has a normal boiling point higher than about 40° C. In another embodiment of the present invention, the solvent has a normal boiling point higher than about 50° C. In yet another embodiment of the present invention, the solvent has a normal boiling point higher than about 60° C. In even yet another embodiment of the present invention, the solvent has a normal boiling point higher than about 70° C. In one embodiment of the present invention, the solvent comprises hexanes. In one embodiment of the present invention, the solvent is hexanes.

IV. Extraction Step

In one embodiment of the present invention, a method for purifying crHDPE to produce nlHDPE comprises extracting said crHDPE with a solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed HDPE (ecrHDPE) is produced.

The extraction step takes place in the two-phase regime of the solvent—HDPE system, i.e., below the cloud point pressure at the specified temperature. As disclosed above, in the two-phase regime, there are the heavy phase (RAF phase) and the light phase (EXTR phase).

Not wishing to be bound by any theory, applicants believe that the extractable contamination migrates from the HDPE in the heavy phase to the solvent in the light phase due to favorable partition coefficient of the extractable contamination between the solvent and HDPE in the extracting step. Extractable contamination is part of the contamination of the waste HDPE and it might include residual processing aids added to HDPE, residual product formulations which contacted HDPE (such as, perfumes and flavors), dyes, and any other extractable material that may have been intentionally added or unintentionally became incorporated into HDPE during waste collection and subsequent accumulation with other waste materials.

Non-limiting examples of liquid-liquid extraction (LLE) equipment that can be used in this extracting step are extraction columns (e.g., static, agitated, or pulsed), mixer—settlers, and centrifugal extractors. Examples of commercial equipment that can be used are Kühni columns, SCHEIBEL® columns, KARR® columns, rotating disc contractor columns, packed columns, sieve columns, etc.

In one embodiment of the present invention, the extracting step takes place in a pressure vessel that may be configured in a way that allows for continuous extraction of the HDPE with the solvent. In another embodiment of the present invention, the pressure vessel may be a continuous liquid-liquid extraction column where molten HDPE is pumped into one end of the extraction column and the solvent is pumped into the same (co-current extraction) or the opposite (counter-current extraction) end of the extraction column.

In one embodiment of the present invention, the solvent or the light phase containing the extracted contamination is removed from the process. In another embodiment of the present invention, the solvent containing the extracted contamination is purified, recovered, and recycled for use in the extracting step or a different step in the method. In yet another embodiment of the present invention, the extracting step is performed in a batch mode, wherein the crHDPE is fixed in a pressure vessel as a polymer phase and the solvent is continuously pumped through the fixed polymer phase. The extracting time or the amount of solvent used will depend on the desired purity of the final purer HDPE and the amount of extractable contamination in the starting crHDPE. In even yet another embodiment of the present invention, the solvent containing the extracted contamination is contacted with solid media in a separate step as described in the purification section below.

In one embodiment of the present invention, the extraction mass concentration is at least about 1 wt %. In another embodiment of the present invention, the extraction mass concentration is at least about 2 wt %. In yet another embodiment of the present invention, the extraction mass concentration is at least about 3 wt %. In even yet another embodiment of the present invention, the extraction mass concentration is at least about 5 wt %. In one embodiment of the present invention, the extraction mass concentration is at least about 10 wt %. For the purposes of the present invention, the extraction mass concentration is the concentration of crHDPE in the two-phase crHDPE—solvent system (i.e., in both the heavy and light phases) in the extracting step.

In one embodiment of the present invention, the extraction temperature is from about 120° C. to about 260° C. In another embodiment of the present invention, the extraction temperature is from about 140° C. to about 240° C. In yet another embodiment of the present invention, the extraction temperature is from about 160° C. to about 220° C. In even yet another embodiment of the present invention, the extraction temperature is from about 180° C. to about 200° C.

In one embodiment of the present invention, the extraction temperature is about 180° C. In another embodiment of the present invention, the extraction temperature is about 200° C. In yet another embodiment of the present invention, the extraction temperature is about 210° C. In even yet another embodiment of the present invention, the extraction temperature is about 220° C. In one embodiment of the present invention, the extraction temperature is about 230° C. In another embodiment of the present invention, the extraction temperature is about 240° C.

In one embodiment of the present invention, the extraction pressure is from about 300 psig (20.7 barg) to about 2,000 psig (137.9 barg). In another embodiment of the present invention, the extraction pressure is from about 500 psig (34.5 barg) to about 1,750 psig (120.7 barg). In yet another embodiment of the present invention, the extraction pressure is from about 750 psig (51.7 barg) to about 1,500 psig (103.4 barg). In even yet another embodiment of the present invention, the extraction pressure is from about 1,000 psig (68.9 barg) to about 1,200 psig (82.7 barg).

In one embodiment of the present invention, the extraction pressure is about 600 psig (41.4 barg). In another embodiment of the present invention, the extraction pressure is about 750 psig (51.7 barg). In yet another embodiment of the present invention, the extraction pressure is about 1,000 psig (68.9 barg). In even yet another embodiment of the present invention, the extraction pressure is about 1,250 psig (86.2 barg). In one embodiment of the present invention, the extraction pressure is about 1,500 psig (103.4 barg). In another embodiment of the present invention, the extraction pressure is about 1,750 psig (120.7 barg). In yet another embodiment of the present invention, the extraction pressure is about 1,900 psig (131 barg).

In one embodiment of the present invention, the solvent is hexanes, the extraction temperature is about 230° C., and the extraction pressure is about 600 psig (41.4 barg). In another embodiment of the present invention, the solvent is hexanes, the extraction temperature is about 220° C., and the extraction pressure is about 500 psig (34.5 barg). In yet another embodiment of the present invention, the solvent is hexanes, the extraction temperature is about 210° C., and the extraction pressure is about 400 psig (27.6 barg). In even yet another embodiment of the present invention, the solvent is hexanes, the extraction temperature is about 200° C., and the extraction pressure is about 300 psig (20.7 barg).

In one embodiment of the present invention, the method for purifying crHDPE to produce nlHDPE comprises: a) Obtaining said crHDPE; wherein said crHDPE is selected from the group consisting of PCR HDPE, PIR HDPE, and combinations thereof; and b) Extracting said crHDPE with hexanes at an extraction mass concentration of about 3.5 wt %, at an extraction temperature of about 230° C., and at an extraction pressure of about 600 psig (41.4 barg) to produce an extracted contaminated reclaimed HDPE (ecrHDPE).

V. Dissolution Step

In one embodiment of the present invention, a method for purifying crHDPE to produce nlHDPE comprises: a) Obtaining said crHDPE; wherein said crHDPE is selected from the group consisting of post-consumer recycled (PCR) HDPE, post-industrial recycled (PIR) HDPE, and combinations thereof; b) Obtaining a solvent; wherein said solvent and said crHDPE form a one-phase solution at a temperature and at a pressure higher than the cloud point pressure corresponding to said temperature; wherein said cloud point pressure: (i) corresponds to a solution of said crHDPE in said solvent at about 5 wt % concentration; (ii) is a monotonically increasing function of temperature; (iii) is lower than the following pressure levels: about 700 psig (48.3 barg) at about 120° C., about 1,150 psig (79.3 barg) at about 140° C., about 1,450 psig (100 barg) at about 160° C., and about 1,800 psig (124.1 barg) at about 180° C.; (iv) includes smooth extrapolations at temperatures lower than about 120° C. and higher than about 180° C.; and (v) includes smooth interpolations at temperatures between about 120° C. and about 180° C.; c) Extracting said crHDPE with said solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed HDPE (ecrHDPE) is produced; and d) Dissolving the ecrHDPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved HDPE and suspended particulate contaminants is produced.

In another embodiment of the present invention, a method for purifying crHDPE to produce nlHDPE comprises: a) Obtaining said crHDPE; wherein said crHDPE is selected from the group consisting of post-consumer recycled (PCR) HDPE, post-industrial recycled (PIR) HDPE, and combinations thereof; b) Extracting said crHDPE with hexanes at an extraction mass concentration of about 3.5 wt %, at an extraction temperature of about 230° C., and at an extraction pressure of about 600 psig (41.4 barg) to produce an extracted contaminated reclaimed HDPE (ecrHDPE); and c) Dissolving the ecrPE in hexanes at a dissolution mass concentration of about 3.5 wt %, at a dissolution temperature of about 210° C., and a dissolution pressure of about 1,900 psig (131 barg) to produce a first suspension comprising dissolved HDPE and suspended particulate contaminants.

In the dissolution step, the ecrHDPE is brought into the one-phase regime of the HDPE—solvent system by changing the pressure and/or temperature so that the dissolution pressure is higher than the cloud point pressure corresponding to the dissolution temperature. The dissolution is aided with mixing at the dissolution temperature and pressure, that can be achieved in typical equipment, such as mixing columns and vessels, static systems, etc. Furthermore, the dissolution temperature and pressure can be controlled in such a way to enable dissolution of HDPE while not dissolving other polymers or polymer mixtures. This controllable dissolution enables the separation of HDPE from polymer mixtures. Once the HDPE is dissolved into the solvent in this dissolution step, the particulate contaminants (e.g. pigments, fillers, dirt, etc.), which are part of the crHDPE, will be released from the HDPE and be suspended, thus forming a first suspension.

In one embodiment of the present invention, a method for purifying crHDPE to produce nlHDPE comprises: a) Extracting the crHDPE in a solvent at an extraction temperature and at an extraction pressure to produce an extracted crHDPE (ecrHDPE); and b) Dissolving the ecrHDPE in said solvent at a dissolution temperature and at a dissolution pressure. In another embodiment of the present invention, a method for purifying crHDPE to produce nlHDPE comprises: a) Extracting the crHDPE in hexanes at an extraction temperature and at an extraction pressure to produce an extracted crHDPE (ecrHDPE); and b) Dissolving the ecrHDPE in hexanes at a dissolution temperature and at a dissolution pressure. In yet another embodiment of the present invention, a method for purifying crHDPE to produce nlHDPE comprises: a) Extracting the crHDPE in hexanes at an extraction temperature from about 120° C. and about 260° C., and at an extraction pressure below the cloud point pressure corresponding to said extraction temperature to produce an extracted crPE (ecrPE); and b) Dissolving the ecrPE in n-pentane at a dissolution temperature from about 120° C. and about 260° C., and at a dissolution pressure above the cloud point pressure corresponding to said dissolution temperature. In even yet another embodiment of the present invention, a method for purifying crHDPE to produce nlHDPE comprises: a) Extracting the crHDPE in hexanes at an extraction temperature from about 140° C. and about 240° C., and at an extraction pressure below the cloud point pressure corresponding to said extraction temperature to produce an extracted crHDPE (ecrHDPE); and b) Dissolving the ecrPE in n-pentane at a dissolution temperature from about 140° C. and about 240° C., and at a dissolution pressure above the cloud point pressure corresponding to said dissolution temperature.

In one embodiment of the present invention, the dissolution temperature is from about 120° C. to about 260° C. In another embodiment of the present invention, the dissolution temperature is from about 140° C. to about 240° C. In yet another embodiment of the present invention, the dissolution temperature is from about 160° C. to about 220° C. In even yet another embodiment of the present invention, the dissolution temperature is from about 180° C. to about 200° C.

In one embodiment of the present invention, the dissolution temperature is about 180° C. In another embodiment of the present invention, the dissolution temperature is about 200° C. In yet another embodiment of the present invention, the dissolution temperature is about 210° C. In even yet another embodiment of the present invention, the dissolution temperature is about 220° C. In one embodiment of the present invention, the dissolution temperature is about 230° C. In another embodiment of the present invention, the dissolution temperature is about 240° C.

In one embodiment of the present invention, the dissolution pressure is from about 300 psig (20.7 barg) to about 2,000 psig (137.9 barg). In another embodiment of the present invention, the dissolution pressure is from about 500 psig (34.5 barg) to about 1,750 psig (120.7 barg). In yet another embodiment of the present invention, the dissolution pressure is from about 750 psig (51.7 barg) to about 1,500 psig (103.4 barg). In even yet another embodiment of the present invention, the dissolution pressure is from about 1,000 psig (68.9 barg) to about 1,200 psig (82.7 barg).

In one embodiment of the present invention, the dissolution pressure is about 600 psig (41.4 barg). In another embodiment of the present invention, the dissolution pressure is about 750 psig (51.7 barg). In yet another embodiment of the present invention, the dissolution pressure is about 1,000 psig (68.9 barg). In even yet another embodiment of the present invention, the dissolution pressure is about 1,250 psig (86.2 barg). In one embodiment of the present invention, the dissolution pressure is about 1,500 psig (103.4 barg). In another embodiment of the present invention, the dissolution pressure is about 1,750 psig (120.7 barg). In yet another embodiment of the present invention, the dissolution pressure is about 1,900 psig (131 barg).

In one embodiment of the present invention, the dissolution mass concentration is at least about 1 wt %. In another embodiment of the present invention, the dissolution mass concentration is at least about 2 wt %. In yet another embodiment of the present invention, the dissolution mass concentration is at least about 3 wt %. In even yet another embodiment of the present invention, the dissolution mass concentration is at least about 5 wt %. In one embodiment of the present invention, the dissolution mass concentration is at least about 10 wt %.

In one embodiment of the present invention, the dissolution solvent is the same as the extraction solvent. In another embodiment of the present invention, the dissolution solvent is different than the extraction solvent.

After the dissolution is achieved and the first suspension is formed, the suspended contaminants are settled (in the settling operation) by experiencing a force that uniformly moves them in the direction of the force. Typically, the applied settling force is gravity, but can also be a centrifugal, centripetal, or other force. The amount of applied force and duration of the settling operation (settling time) will depend upon several parameters, including, but not limited to, particle size of the contaminant particles, contaminant particle density, density of the solution, and viscosity of the solution. Some of the key parameters that determine the solution viscosity are the chemical composition of the solvent, the molecular weight and concentration of the HDPE dissolved in the solvent, and the temperature and pressure of the solution. At the end of the settling operation, a layer of settled particulate contaminants and a second suspension are produced. The second suspension includes the suspended remaining particulate contaminants, that have not been settled in the settled layer. Typically, the larger contaminant particles are settled and the smaller contaminant particles are suspended in the second suspension. Typically, the temperature, pressure, and concentration conditions of the settling operation are the same as those of the dissolution step. Processing aids to help the settling operation, such as flocculation aids, can also be added in the first suspension or in the contaminated reclaimed HDPE or at any point in this method.

In one embodiment of the present invention, a method for purifying crHDPE to produce nlHDPE comprises settling said first suspension at a settling temperature and at a settling pressure; said settling temperature is from about 120° C. to about 260° C.; said settling pressure is above the cloud point pressure corresponding to said settling temperature; and a second suspension comprising dissolved HDPE and suspended remaining particulate contaminants is produced. In another embodiment of the present invention, a method for purifying crHDPE to produce nlHDPE comprises settling said first suspension at a settling temperature and at a settling pressure; said settling temperature is from about 140° C. to about 240° C.; said settling pressure is above the cloud point pressure corresponding to said settling temperature; and a second suspension comprising dissolved HDPE and suspended remaining particulate contaminants is produced. In yet another embodiment of the present invention, a method for purifying crHDPE to produce nlHDPE comprises settling said first suspension at a settling temperature and at a settling pressure; said settling temperature is from about 160° C. to about 220° C.; said settling pressure is above the cloud point pressure corresponding to said settling temperature; and a second suspension comprising dissolved HDPE and suspended remaining particulate contaminants is produced. In even yet another embodiment of the present invention, a method for purifying crHDPE to produce nlHDPE comprises settling said first suspension at a settling temperature and at a settling pressure; said settling temperature is from about 180° C. to about 200° C.; said settling pressure is above the cloud point pressure corresponding to said settling temperature; and a second suspension comprising dissolved HDPE and suspended remaining particulate contaminants is produced.

In one embodiment of the present invention, a method for purifying crHDPE to produce nlHDPE comprises settling said first suspension at about 210° C. and about 1,900 psig (131 barg) to produce a second suspension comprising dissolved HDPE and suspended remaining particulate contaminants. In another embodiment of the present invention, the solvent is hexanes, the extraction temperature is about 230° C. and the extraction pressure is about 600 psig (41.4 barg), the dissolution temperature is about 210° C. and the dissolution pressure is about 1,900 psig (131 barg), and the settling temperature is about 210° C. and the settling pressure is about 1,900 psig (131 barg).

The purification of said second suspension proceeds by contacting said second suspension with solid media. For the purposes of the present invention, the solid media are any solid materials that remove at least some of the contamination (particulate or not) from the second suspension. Although not wishing to be bound by any theory, applicants believe that the solid media remove the contamination by a variety of mechanisms. Non-limiting examples of possible mechanisms include adsorption, absorption, size exclusion, ion exclusion, ion exchange, and other mechanisms that are well known to those having ordinary skill in the art. Furthermore, the pigments and other contaminants commonly found in crHDPE may be polar compounds and may preferentially interact with the solid media, which may also be at least slightly polar. The polar-polar interactions are especially favorable when a non-polar solvent, such as alkane, is used as the solvent.

In one embodiment of the present invention, the solid media are selected from the group consisting of inorganic material, carbon-based material, and mixtures thereof. Non-limiting examples of inorganic materials are silica (silicon oxide), alumina (aluminum oxide), activated alumina (activated aluminum oxide), iron oxide, aluminum silicate, magnesium silicate, amorphous volcanic glass, reclaimed glass, silica gel, diatomaceous earth, sand, quartz, perlite, fuller's earth, bentonite, and mixtures thereof. In another embodiment of the present invention, the inorganic material is selected from the group consisting of silica, alumina, iron oxide, aluminum silicate, amorphous volcanic glass, and mixtures thereof. In yet another embodiment of the present invention, the inorganic material comprises diatomaceous earth. In even yet another embodiment of the present invention, the inorganic material comprises activated alumina. In one embodiment of the present invention, the inorganic material comprises reclaimed glass.

Non-limiting examples of carbon-based materials are anthracite coal, carbon black, coke, activated carbon, cellulose, and mixtures thereof. In one embodiment of the present invention, the carbon-based material is selected from the group consisting of anthracite coal, carbon black, coke, activated carbon, cellulose, and mixtures thereof. In another embodiment of the present invention, the carbon-based material comprises activated carbon.

In one embodiment of the present invention, the solid media are contacted with the second suspension in a mixing vessel for a specified amount of time while the contents of the vessel are mixed. In another embodiment of the present invention, the solid media are removed from the mixing vessel via a solid-liquid separation step. Non-limiting examples of solid-liquid separation steps include filtration, decantation, centrifugation, and settling.

In one embodiment of the present invention, the second suspension is passed through a stationary bed of solid media. In another embodiment of the present invention, the solid media are placed in an axial flow filter. In yet another embodiment of the present invention, the solid media are placed in a radial flow filter. A non-limiting example of a radial flow filter is a candle filter. In even yet another embodiment of the present invention, the solid media are placed in a candle filter.

In one embodiment of the present invention, the height or length of the stationary bed of solid media is greater than 5 cm. In another embodiment of the present invention, the height or length of the stationary bed of solid media is greater than 10 cm. In yet another embodiment of the present invention, the height or length of the stationary bed of solid media is greater than 20 cm. In even yet another embodiment of the present invention, the solid media are replaced as needed to maintain a desired purity of HDPE. In one embodiment, the solid media are regenerated and re-used in the purification step. In another embodiment, the solid media are regenerated by fluidizing the solid media during a backwashing step.

In one embodiment of the present invention, the purification comprises contacting the second suspension with the solid media in a candle filter followed by an axial flow filter, and the solid media of the candle filter comprise diatomaceous earth and the solid media of the axial flow filter comprise activated alumina.

In one embodiment of the present invention, a method for purifying crHDPE to produce nlHDPE comprises: a) Obtaining said crHDPE; wherein said crHDPE is selected from the group consisting of post-consumer recycled (PCR) HDPE, post-industrial recycled (PIR) HDPE, and combinations thereof; b) Obtaining a solvent; wherein said solvent and said crHDPE form a one-phase solution at a temperature and at a pressure higher than the cloud point pressure corresponding to said temperature; wherein said cloud point pressure: (i) corresponds to a solution of said crHDPE in said solvent at about 5 wt % concentration; (ii) is a monotonically increasing function of temperature; (iii) is about 100 psig (6.4 barg) at about 140° C., about 383 psig (26.4 barg) at about 160° C., about 770 psig (53.1 barg) at about 180° C., about 1,200 psig (82.7 barg) at about 200° C., and about 1,515 psig (104.5 barg) at about 220° C.; (iv) includes smooth extrapolations at temperatures lower than about 140° C. and higher than about 220° C.; and (v) includes smooth interpolations at temperatures between about 140° C. and about 220° C.; c) Extracting said crHDPE with said solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed HDPE (ecrHDPE) is produced; d) Dissolving the ecrHDPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved HDPE and suspended particulate contaminants is produced; e) Settling said first suspension at a settling temperature and at a settling pressure; wherein said settling temperature is from about 120° C. to about 260° C.; wherein said settling pressure is above the cloud point pressure corresponding to said settling temperature; and wherein a second suspension comprising dissolved HDPE and suspended remaining particulate contaminants is produced; and 0 Purifying said second suspension at a purification temperature and at a purification pressure by contacting said second suspension with solid media; wherein said purification temperature is from about 120° C. to about 260° C.; wherein said purification pressure is above the cloud point pressure corresponding to said purification temperature; and wherein a third suspension comprising purer HDPE is produced.

In another embodiment of the present invention, a method for purifying crHDPE to produce nlHDPE comprises: a) Obtaining said crHDPE; wherein said crHDPE is selected from the group consisting of post-consumer recycled (PCR) HDPE, post-industrial recycled (PIR) HDPE, and combinations thereof; b) Extracting said crHDPE with hexanes at an extraction mass concentration of about 3.5 wt %, at an extraction temperature of about 230° C., and at an extraction pressure of about 600 psig (41.4 barg) to produce an extracted contaminated reclaimed HDPE (ecrHDPE); c) Dissolving the ecrHDPE in hexanes at a mass concentration of about 3.5 wt %, at a dissolution temperature of about 210° C., and at a dissolution pressure of about 1,900 psig (131 barg) to produce a first suspension comprising dissolved HDPE and suspended particulate contaminants; e) Settling said first suspension at about 210° C. and at about 1,900 psig (131 barg) to produce a second suspension comprising dissolved HDPE and suspended remaining particulate contaminants; and 0 Purifying said second suspension by contacting said second suspension with solid media at about 210° C. and at about 1,900 psig (131 barg) to produce a third suspension comprising purer HDPE; wherein said purification comprises contacting said second suspension with said solid media in a candle filter followed by an axial flow filter; and wherein said solid media of said candle filter comprise diatomaceous earth and said solid media of said axial flow filter comprise activated alumina.

In yet another embodiment of the present invention, the solvent is hexanes; the extraction temperature is about 230° C. and the extraction pressure is about 600 psig (41.4 barg); the dissolution temperature is about 210° C. and the dissolution pressure is about 1,900 psig (131 barg); the settling temperature is about 210° C. and the settling pressure is about 1,900 psig (131 barg); and the purification temperature is about 210° C. and the purification pressure is about 1,900 psig (131 barg).

Typically, the type of solvent and HDPE mass concentration in the purification step, and purification temperature and pressure are the same as those in the dissolution step and/or those in the extraction step.

In one embodiment of the present invention, the purification mass concentration is at least about 1 wt %. In another embodiment of the present invention, the purification mass concentration is at least about 2 wt %. In yet another embodiment of the present invention, the purification mass concentration is at least about 3 wt %. In even yet another embodiment of the present invention, the purification mass concentration is at least about 5 wt %. In one embodiment of the present invention, the purification mass concentration is at least about 10 wt %.

In one embodiment of the present invention, a method for purifying crHDPE to produce nlHDPE comprises separating the purer HDPE from the third suspension. In another embodiment of the present invention, the separation of the purer HDPE from the third suspension takes place at a separation temperature and at a separation pressure; and wherein the HDPE precipitates from solution and is no longer dissolved in the solvent. In yet another embodiment of the present invention, the separation of the purer HDPE from the solvent is accomplished by reducing the separation pressure at a fixed separation temperature. In even yet another embodiment of the present invention, the separation of the purer HDPE from the solvent is accomplished by reducing the separation temperature at a fixed separation pressure. In one embodiment of the present invention, the separation of the purer HDPE from the solvent is accomplished by increasing the separation temperature at a fixed separation pressure. In another embodiment, the separation of the purer HDPE from the solvent is accomplished by reducing both the separation temperature and separation pressure.

The solvent can be partially or completely converted from the liquid to the vapor phase by controlling the separation temperature and separation pressure. In one embodiment of the present invention, the separation of the purer HDPE from the solvent is accomplished without completely converting the solvent into a 100% vapor by controlling the separation temperature and separation pressure of the solvent during the separation step.

The separation of the purer HDPE from the solvent can be accomplished by any method of liquid-liquid or liquid-solid separation. Non-limiting examples of liquid-liquid or liquid-solid separations include filtration, decantation, centrifugation, and settling.

VI Purer HDPE

In one embodiment of the present invention, the purer HDPE, which may be sourced from PCR HDPE, is essentially contaminant-free, pigment-free, odor-free, homogenous, and similar in properties to natural HDPE (nHDPE). In another embodiment of the present invention, the physical properties of the solvent may enable more energy efficient methods for separation of the solvent from the purer HDPE.

In one embodiment of the present invention, the purer HDPE has natural-like optical properties (nlHDPE). In another embodiment of the present invention, the purer HDPE has natural-like optical properties (nlHDPE); and the nlHDPE has L* greater than about 75, a* greater than about −6, b* less than about 11, and Y less than about 80%.

In one embodiment of the present invention, a method for purifying crHDPE to produce nlHDPE comprises: a) Obtaining said crHDPE; wherein said crHDPE is selected from the group consisting of post-consumer recycled (PCR) HDPE, post-industrial recycled (PIR) HDPE, and combinations thereof; b) Obtaining a solvent; wherein said solvent and said crHDPE form a one-phase solution at a temperature and at a pressure higher than the cloud point pressure corresponding to said temperature; wherein said cloud point pressure: (i) corresponds to a solution of said crHDPE in said solvent at about 5 wt % concentration; (ii) is a monotonically increasing function of temperature; (iii) is lower than the following pressure levels: about 700 psig (48.3 barg) at about 120° C., about 1,150 psig (79.3 barg) at about 140° C., about 1,450 psig (100 barg) at about 160° C., and about 1,800 psig (124.1 barg) at about 180° C.; (iv) includes smooth extrapolations at temperatures lower than about 120° C. and higher than about 180° C.; and (v) includes smooth interpolations at temperatures between about 120° C. and about 180° C.; c) Extracting said crHDPE with said solvent at an extraction mass concentration of at least about 1 wt %, at an extraction temperature, and an extraction pressure; wherein said extraction temperature is from about 120° C. to about 260° C.; wherein said extraction pressure is below the cloud point pressure corresponding to said extraction temperature; and wherein an extracted contaminated reclaimed HDPE (ecrHDPE) is produced; d) Dissolving the ecrHDPE in said solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved HDPE and suspended particulate contaminants is produced; e) Settling said first suspension at a settling temperature and at a settling pressure; wherein said settling temperature is from about 120° C. to about 260° C.; wherein said settling pressure is above the cloud point pressure corresponding to said settling temperature; and wherein a second suspension comprising dissolved HDPE and suspended remaining particulate contaminants is produced; f) Purifying said second suspension at a purification temperature and at a purification pressure by contacting said second suspension with solid media; wherein said purification temperature is from about 120° C. to about 260° C.; wherein said purification pressure is above the cloud point pressure corresponding to said purification temperature; and wherein a third suspension comprising purer HDPE is produced; and g) Separating said purer HDPE from said third suspension; and wherein said purer HDPE is said nlHDPE.

In another embodiment of the present invention, a method for purifying crHDPE to produce nlHDPE comprises: a) Obtaining said crHDPE; wherein said crHDPE is selected from the group consisting of post-consumer recycled (PCR) HDPE, post-industrial recycled (PIR) HDPE, and combinations thereof; b) Extracting said crHDPE with hexanes at an extraction mass concentration of about 3.5 wt %, at an extraction temperature of about 230° C., and at an extraction pressure of about 600 psig (41.4 barg) to produce an extracted contaminated reclaimed HDPE (ecrHDPE); c) Dissolving the ecrHDPE in hexanes at a mass concentration of about 3.5 wt %, at a dissolution temperature of about 210° C., and at a dissolution pressure of about 1,900 psig (131 barg) to produce a first suspension comprising dissolved HDPE and suspended particulate contaminants; d) Settling said first suspension at about 210° C. and at about 1,900 psig (131 barg) to produce a second suspension comprising dissolved HDPE and suspended remaining particulate contaminants; e) Purifying said second suspension by contacting said second suspension with solid media at about 210° C. and at about 1,900 psig (131 barg) to produce a third suspension comprising purer HDPE; wherein said purification comprises contacting said second suspension with said solid media in a candle filter followed by an axial flow filter; and wherein said solid media of said candle filter comprise diatomaceous earth and said solid media of said axial flow filter comprise activated alumina; and f) Separating said purer HDPE from said third suspension; wherein said purer HDPE is said nlHDPE; and wherein said nlHDPE has L* greater than about 75, a* greater than about −6, b* less than about 11, and Y less than about 80%.

In yet another embodiment of the present invention, the solvent is hexanes; the extraction temperature is about 230° C. and the extraction pressure is about 600 psig (41.4 barg); the dissolution temperature is about 210° C. and the dissolution pressure is about 1,900 psig (131 barg); the settling temperature is about 210° C. and the settling pressure is about 1,900 psig (131 barg); the purification temperature is about 210° C. and the purification pressure is about 1,900 psig (131 barg); and the nlHDPE has L* greater than about 75, a* greater than about −6, b* less than about 11, and Y less than about 80%.

In one embodiment of the present invention, a method for purifying crHDPE to produce nlHDPE comprises de-inking of said crHDPE. A non-limiting example of a de-inking process is described in U.S. Pat. No. 9,616,595, which discloses an ink removal step with the use of an aqueous cleaning fluid with high pH and selective cleaning agents, such as dodecyl sulfate, and high turbulence.

VII Examples

Example 1

Figure 2:
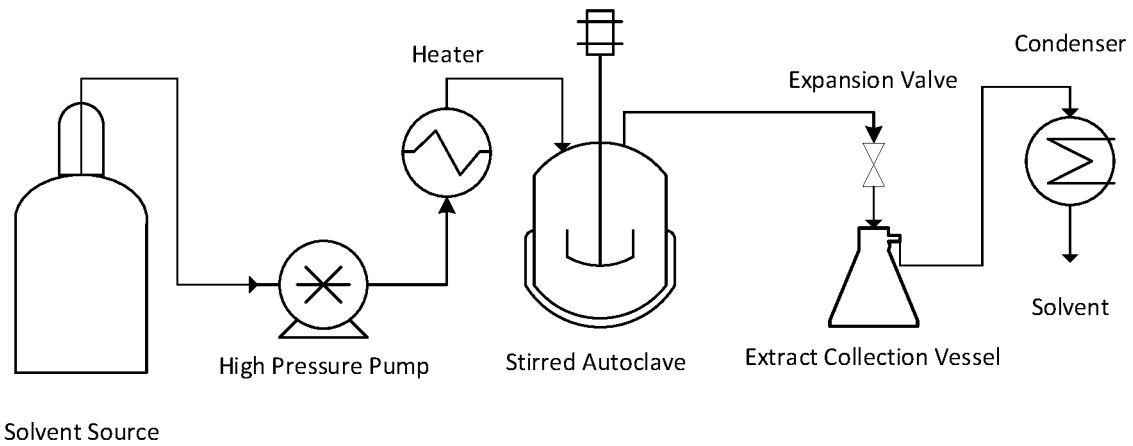
FIG. 2 is a block flow diagram showing the major components of the extraction step of the method of the present invention.
Figure 3:
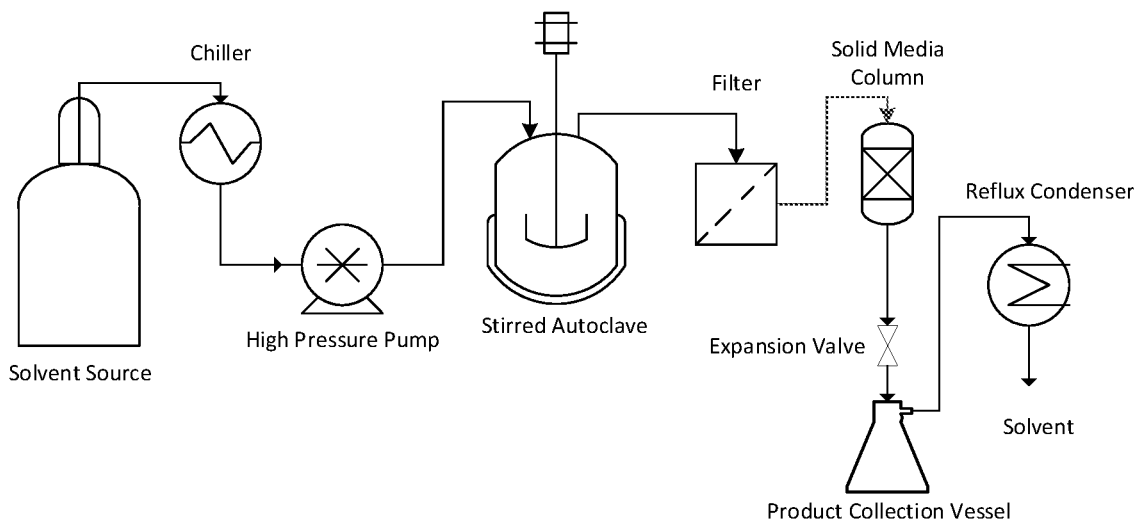
FIG. 3 is a block flow diagram showing the major components of the dissolution step of the method of the present invention.

A sample of post-consumer recycled HDPE "mixed color" flake (also called HDPE Jazz Flake or HDPE JF; used to produce the TPS-8000 product; TABB Packaging Solutions, LLC; Canton, MI) was processed using the experimental apparatuses shown in FIGS. 2 and 3 and the following procedure (at Phasex Corporation, 125 Flagship Drive, North Andover, MA). 75 g of HDPE JF were loaded into a 7.695 L (working volume) autoclave (Model 4552M; Parr Instrument Company; Moline, IL) equipped with an overhead mechanical stirrer. The air from the autoclave headspace was removed with 3 repeat cycles of vacuuming and N2 purging. The autoclave was then filled with 3,472 g of hexanes (Catalog #: 35900ACS; >98.5% Hexane isomers and methyl cyclopentane; Pharmco by Greenfield Global, Inc.; Brookfield, CT) and its contents were equilibrated at an internal temperature of about 230° C. and pressure of about 600 psig (41.4 barg), i.e., extraction conditions. At those extraction conditions the material in the autoclave is in a two-phase regime, i.e., one phase with hexanes and a small amount of low-molecular-weight HDPE JF dissolved (light or extract phase) and the other phase with a large amount of HDPE JF dissolved in hexanes (heavy or raffinate phase). The autoclave material was then extracted 5 times using the experimental configuration of FIG. 2 and the following procedure: the autoclave material was stirred for about 10 min at about 680 rpms, then it was allowed to settle for about 10 min, and finally one vessel volume of hexanes was flushed through the autoclave into the extract collection flask through an expansion valve. The above extraction procedure was repeated four more times. The material collected from all 5 extraction cycles was labeled "PE-27 Fraction 1". The remaining autoclave material was then dissolved in hexanes at the dissolution conditions of about 210° C. and about 1900 psig (131 barg), thus creating a one-phase system. The dissolved material was purified and collected using the experimental configuration of FIG. 3 and the following procedure: the autoclave material was stirred for about 60 min at about 680 rpms, then it was allowed to settle for about 60 min, then the autoclave material was removed from the autoclave by opening the autoclave valve and allowing it to pass through a candle filter, an activated alumina column, an expansion valve, and get collected into the product collection flask. The candle filter (FUNDABAC® Filter High pressure TSD with filter volume about 1 L; Dr Mueller A G, Maennedorf, Switzerland) had a stainless-steel sock/hose (about 5.5 in. (14 cm) long) coated with about 18 g of diatomaceous earth (Celatom® FW-40; EP Minerals, LLC; Reno, NV). The activated alumina column had about 0.68 in. (1.73 cm) ID and about 30 in. (76.2 cm) length, and it was charged with about 120 g of spherical activated alumina particles 1/16 in. (1.59 mm), 7×14 mesh (1.41 mm-2.83 mm; Catalog #: 87014; Sorbent Technologies, Inc.; Norcross, GA). The product fractions were labelled sequentially starting with "PE-27 Fraction 2". Fractions were collected until". Fractions were collected until a low solubility was noticed/calculated. After all samples were collected, the autoclave was equilibrated to atmospheric pressure and room temperature. All residual material in the autoclave was then collected as a residuum sample.

The PE-27 Fraction 2, PE-27 Fraction 3, and PE-27 Fraction 4 were compression molded into 1-mm thick and 30×30 mm windows (following the principles of ASTM D4703-16 "Standard Practice for Compression Molding Thermoplastic Materials into Test Specimens, Plaques, or Sheets"). The temperature used for the compression molding was about 160° C., the pressure was about 1.8 metric tons, and Teflon sheets were used as release liners. The optical properties of these windows were then measured (following the principles of ASTM E308 "Standard Practice for Computing the Colors of Objects by Using the CIE System") using the LabScan XE (Hunter Associates Laboratory, Inc.; Reston, VA) and D65/10 conditions, i.e., D65 light source and 10-degree observer angle. The results were: $L^*$=77.4±1.4; $a^*$=−5.3±1.5; $b^*$=10.7±2.2; and Y (opacity)= 78.2%±14.1%.

For comparison, a typical blow-molding virgin HDPE (Formolene® HB5502F; Formosa Plastics Corp.; Livingston, NJ) has the following optical values: $L^*$=85.9±0.1; $a^*$=−1.3±0.0; $b^*$=−0.3±0.0; and Y (opacity)=41.3%±0.6%. Also, a typical film grade virgin low-density PE (LDPE) (Dow™ 640i; Dow Chemical Company, Midland, MI) has the following optical values: $L^*$=83.7±0.2; $a^*$=−0.5±0.0; $b^*$=1.3±0.1; and Y (opacity)=17.8%±1.5%. Finally, a typical film grade virgin linear low-density PE (LLDPE) (Dowlex™ 2045G; Dow Chemical Company; Midland, MI) has the following optical values: $L^*$=82.6±1.2; $a^*$=−1.0±0.1; $b^*$=2.1±0.2; and Y (opacity)=15.4%±1.9%. The relatively low value of $b^*$ for the virgin HDPE resin vs. that for the LDPE and LLDPE resins is due to specific additives used for HDPE.

For comparison, the HDPE JF, which was fed into EXAMPLE 1, in pellet form, had the following optical properties: $L^*$=64.6±3.6; $a^*$=16±13; $b^*$=16.8±6.4; and Y (opacity)=100%. A natural recycled HDPE material (KWR101-150; KW Plastics, Inc.; Troy, AL) had the following optical properties: $L^*$=77.2±0.7; $a^*$=−0.8±0.3; $b^*$=5.7±0.2; and Y (opacity)=57.2%±1.6%.

The results from EXAMPLE 1, virgin HDPE, HDPE JF, and natural recycled HDPE are summarized in TABLE 1 below.

TABLE 1

| EXAMPLE # | $L^*$, [—] | $a^*$, [—] | $b^*$, [—] | Y, [%] |
| --- | --- | --- | --- | --- |
| Virgin HDPE (HB5502F) | 85.9 ± 0.1 | −1.3 ± 0.0 | −0.3 ± 0.0 | 41.3 ± 0.6 |
| HDPE Jazz Flake TPS-8000 | 64.6 ± 3.6 | 16.0 ± 12.8 | 16.8 ± 6.4 | 100 |
| KWR101-150 Natural rHDPE | 77.2 ± 0.7 | −0.8 ± 0.3 | 5.7 ± 0.2 | 57.2 ± 1.6 |
| 1 | 77.4 ± 1.4 | −5.3 ± 1.5 | 10.7 ± 2.2 | 78.2 ± 14.1 |

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for purifying contaminated reclaimed high-density polyethylene (crHDPE) to produce recycled HDPE with natural-like optical properties (nlHDPE) comprising:
    a. Obtaining said crHDPE; wherein said crHDPE is selected from the group consisting of post-consumer recycled (PCR) HDPE, post-industrial recycled (PIR) HDPE, and combinations thereof;
    b. Obtaining an extraction solvent; wherein said extraction solvent and said crHDPE form a one-phase solution at a temperature and at a pressure higher than the cloud point pressure corresponding to said temperature; wherein said cloud point pressure:
        i. corresponds to a solution of said crHDPE in said extraction solvent at about 5 wt % concentration;
        ii. is a monotonically increasing function of temperature;
        iii. is lower than the following pressure levels: about 700 psig (48.3 barg) at about 120° C., about 1,150 psig (79.3 barg) at about 140° C., about 1,450 psig (100 barg) at about 160° C., and about 1,800 psig (124.1 barg) at about 180° C.;
        iv. includes smooth extrapolations at temperatures lower than about 120° C. and higher than about 180° C.; and
        v. includes smooth interpolations at temperatures between about 120° C. and about 180° C.;
    c. Extracting said crHDPE with said extraction solvent at an extraction mass concentration of at least about 1 wt %, at an extraction temperature, and at an extraction pressure; wherein said extraction temperature is from about 120° C. to about 260° C.; wherein said extraction pressure is below the cloud point pressure corresponding to said extraction temperature; and wherein an extracted contaminated reclaimed HDPE (ecrHDPE) is produced;
    d. Dissolving the ecrHDPE in a dissolution solvent at a dissolution mass concentration of at least about 1 wt %, at a dissolution temperature, and at a dissolution pressure; wherein said dissolution temperature is from about 120° C. to about 260° C.; wherein said dissolution pressure is above the cloud point pressure corresponding to said dissolution temperature; and wherein a first suspension comprising dissolved HDPE and suspended particulate contaminants is produced;
    e. Settling said first suspension at a settling temperature and at a settling pressure; wherein said settling temperature is from about 120° C. to about 260° C.; wherein said settling pressure is above the cloud point pressure corresponding to said settling temperature; and wherein a second suspension comprising dissolved HDPE and suspended remaining particulate contaminants is produced;
    f. Purifying said second suspension at a purification temperature and at a purification pressure by contacting said second suspension with solid media; wherein said purification temperature is from about 120° C. to about 260° C.; wherein said purification pressure is above the cloud point pressure corresponding to said purification temperature; and wherein a third suspension comprising purer HDPE is produced; and
    g. Separating said purer HDPE from said third suspension; and wherein said purer HDPE is said nlHDPE;
    wherein at least one of said extraction solvent or said dissolution solvent has a normal boiling point higher than about 70° C.; and wherein said nlHDPE has an L* greater than about 75, a* greater than about −6, b* lower than about 11, and Y lower than about 80%.

2. The method of claim 1, wherein said cloud point pressure is about 100 psig (6.9 barg) at about 140° C., about 383 psig (26.4 barg) at about 160° C., about 770 psig (53.1 barg) at about 180° C., about 1,200 psig (82.7 barg) at about 200° C., and about 1,515 psig (104.5 barg) at about 220° C.

3. The method of claim 1, wherein said extraction solvent is the same as said dissolution solvent.

4. The method of claim 1, wherein said extraction mass concentration is greater than about 2 wt %.

5. The method of claim 4, wherein said extraction mass concentration is greater than about 3 wt %.

6. The method of claim 5, wherein said extraction mass concentration is greater than about 5 wt %.

7. The method of claim 1, wherein said solid media are selected from the group consisting of inorganic material, carbon-based material, and mixtures thereof.

8. The method of claim 7, wherein said inorganic material is selected from the group consisting of silica, alumina, iron oxide, aluminum silicate, amorphous volcanic glass, and mixtures thereof.

9. The method of claim 8, wherein said inorganic material comprises activated alumina.

10. The method of claim 7, wherein said carbon-based material is selected from the group consisting of anthracite coal, carbon black, coke, activated carbon, cellulose, and mixtures thereof.

11. The method of claim 1, wherein said solid media are placed in an axial flow filter.

12. The method of claim 1, wherein said solid media are placed in a candle filter.

13. The method of claim 1, wherein said purification comprises contacting said second suspension with said solid media in a candle filter followed by an axial flow filter; and wherein said solid media of said candle filter comprise diatomaceous earth and said solid media of said axial flow filter comprise activated alumina.

14. The method of claim 1, wherein said extraction temperature is about 230° C. and said extraction pressure is about 600 psig (41.4 barg); wherein said dissolution temperature is about 210° C. and said dissolution pressure is about 1,900 psig (131 barg); wherein said settling temperature is about 210° C. and said settling pressure is about 1,900 psig (131 barg); wherein said purification temperature is about 210° C. and said purification pressure is about 1,900 psig (131 barg); and wherein said nlHDPE has L* greater than about 75, a* greater than about −6, b* less than about 11 and Y less than about 80%.

15. A method for purifying crHDPE to produce nlHDPE comprising:
  a. Obtaining said crHDPE; wherein said crHDPE is selected from the group consisting of post-consumer recycled (PCR) HDPE, post-industrial recycled (PIR) HDPE, and combinations thereof;
  b. Extracting said crHDPE with an extraction solvent at an extraction mass concentration of about 3.5 wt %, at an extraction temperature of about 230° C., and at an extraction pressure of about 600 psig (41.4 barg) to produce an extracted contaminated reclaimed HDPE (ecrHDPE);
  c. Dissolving the ecrHDPE in a dissolution solvent at a mass concentration of about 3.5 wt %, at a dissolution temperature of about 210° C., and at a dissolution pressure of about 1,900 psig (131 barg) to produce a first suspension comprising dissolved HDPE and suspended particulate contaminants;
  d. Settling said first suspension at about 210° C. and at about 1,900 psig (131 barg) to produce a second suspension comprising dissolved HDPE and suspended remaining particulate contaminants;
  e. Purifying said second suspension by contacting said second suspension with solid media at about 210° C. and at about 1,900 psig (131 barg) to produce a third suspension comprising purer HDPE; wherein said purification comprises contacting said second suspension with said solid media in a candle filter followed by an axial flow filter; and wherein said solid media of said candle filter comprise diatomaceous earth and said solid media of said axial flow filter comprise activated alumina; and
  f. Separating said purer HDPE from said third suspension; wherein said purer HDPE is said nlHDPE;
  wherein at least one of said extraction solvent or said dissolution solvent has a normal boiling point higher than about 70° C.; and wherein said nlHDPE has L* greater than about 75, a* greater than about −6, b* less than about 11, and Y less than about 80%.

16. The method of claim 15, wherein said extraction solvent is the same as said dissolution solvent.

* * * * *